United States Patent
Odom et al.

(10) Patent No.: US 11,094,933 B2
(45) Date of Patent: Aug. 17, 2021

(54) POLYSILOXANE BINDERS

(71) Applicant: University of Kentucky Research Foundation, Lexington, KY (US)

(72) Inventors: Susan A. Odom, Lexington, KY (US); Darius A Shariaty, Lexington, KY (US); Yang-Tse Cheng, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 138 days.

(21) Appl. No.: 15/653,126

(22) Filed: Jul. 18, 2017

(65) Prior Publication Data

US 2018/0019470 A1 Jan. 18, 2018

Related U.S. Application Data

(60) Provisional application No. 62/363,646, filed on Jul. 18, 2016.

(51) Int. Cl.
| | |
|---|---|
| *H01M 4/38* | (2006.01) |
| *H01M 4/62* | (2006.01) |
| *H01M 10/0525* | (2010.01) |
| *C08G 77/20* | (2006.01) |
| *H01M 4/587* | (2010.01) |
| *H01M 4/134* | (2010.01) |
| *H01M 4/1395* | (2010.01) |
| *H01M 4/36* | (2006.01) |
| *C08L 83/04* | (2006.01) |
| *C08G 77/16* | (2006.01) |

(52) U.S. Cl.
CPC ............ *H01M 4/386* (2013.01); *C08G 77/20* (2013.01); *C08L 83/04* (2013.01); *H01M 4/134* (2013.01); *H01M 4/1395* (2013.01); *H01M 4/366* (2013.01); *H01M 4/587* (2013.01); *H01M 4/622* (2013.01); *H01M 4/625* (2013.01); *H01M 10/0525* (2013.01); *C08G 77/16* (2013.01)

(58) Field of Classification Search
CPC ...... H01M 4/386; H01M 4/622; H01M 4/134; H01M 4/1395; H01M 4/366; H01M 4/587; H01M 4/625; H01M 10/0525; C08G 77/20; C08G 77/16; C08L 83/04
See application file for complete search history.

(56) References Cited

U.S. PATENT DOCUMENTS

| 5,824,280 A | 10/1998 | Dahn et al. | |
|---|---|---|---|
| 2012/0153219 A1* | 6/2012 | Zhang | H01M 4/622 252/182.1 |
| 2012/0177992 A1* | 7/2012 | Miyoshi | H01M 4/134 429/211 |
| 2015/0376400 A1* | 12/2015 | Kang | C08L 23/0869 362/350 |

FOREIGN PATENT DOCUMENTS

| BR | 102014001027 | * 12/2015 |
|---|---|---|
| EP | 2757617 A1 | 7/2014 |
| JP | 2001068115 A | 3/2001 |
| JP | 2010238562 A | 10/2010 |
| JP | 2013069466 A | 4/2013 |
| KR | 20130011154 A | 1/2013 |

OTHER PUBLICATIONS

Graetz, et al., Nanoscale Anodes of Silicon and Germanium for Lithium Batteries. Nanomaterials for Lithium-Ion Batteries, Pan Stanford Publishing: (2013) 69-94.
Paz-Garcia, et al., "4D analysis of the microstructural evolution of Si-based electrodes during lithiation: Time-lapse X-ray imaging and digital volume correlation." Journal of Power Sources 320: (2016)196-203.
Liu, et al., "Size-dependent fracture of silicon nanoparticles during lithiation." ACS Nano 6(2): (2012)1522-1531.
Fang, et al., "Improving the Electrochemical Performance of Si Nanoparticle Anode Material by Synergistic Strategies of Polydopamine and Graphene Oxide Coatings." The Journal of Physical Chemistry C 119(4): (2015)1720-1728.
Delpuech, N., et al. (2014). "Critical Role of Silicon Nanoparticles Surface on Lithium Cell Electrochemical Performance Analyzed by FTIR, Raman, EELS, XPS, NMR, and BDS Spectroscopies." The Journal of Physical Chemistry C 118(31): 17318-17331.
Xu, J., et al. (2015). "High Capacity Silicon Electrodes with Nafion as Binders for Lithium-Ion Batteries." Journal of the Electrochemical Society 163(3): A401-A405.
Magasinski, A., et al. (2010). "Toward efficient binders for Li-ion battery Si-based anodes:polyacrylic acid." ACS Appl Mater Interfaces 2(11): 3004-3010.
Buqa, H., et al. (2006). "Study of styrene butadiene rubber and sodium methyl cellulose as binder for negative electrodes in lithium-ion batteries." Journal of Power Sources 161(1):617-622.
Jeena, M. T. et al. (2014). "Multifunctional molecular design as an efficient polymeric binder for silicon anodes in lithium-ion batteries." ACS Appl Mater Interfaces 6(20): 18001-18007.
Koo, B., et al. (2012). "A highly cross-linked polymeric binder for high-performance silicon negative electrodes in lithium ion batteries." Angew Chem Int Ed Engl 51(35): 8762-8767.
Liu, B., et al. (2013). "Three-dimensional hierarchical ternary nanostructures for high-performance Li-ion battery anodes." Nano Lett 13(7): 3414-3419.
Wang, Q. T., et al. (2014). "Enhanced cycling stability of silicon anode by in situ polymerization of poly(aniline-co-pyrrole)." RSC Advances 4(96): 54134-54139.

(Continued)

*Primary Examiner* — Laura Weiner (74) *Attorney, Agent, or Firm* — Stites & Harbison PLLC; Mandy Wilson Decker (57) ABSTRACT

Electrodes for rechargeable batteries that include silicon and a binder are provided. Binders for use with silicon electrodes are provided, including polysiloxane binders that can be prepared prior to preparation of the electrode, or provided as monomers to be cure-polymerized at the time of the curing of the electrode.

17 Claims, 10 Drawing Sheets

(56) References Cited

OTHER PUBLICATIONS

Wu, H., et al. (2013). "Stable Li-ion battery anodes by in-situ polymerization of conducting hydrogel to conformally coat silicon nanoparticles." Nat Commun 4: 1943.

Yu, X., et al. (2015). "Three-Dimensional Conductive Gel Network as an Effective Binder for High-Performance Si Electrodes in Lithium-Ion Batteries." ACS Appl Mater Interfaces 7(29): 15961-15967.

Chiu, H.-T. and J.-H. Wu (2005). "Conductive effect of an electronic/ionic complex conductivity modifier for silicone elastomers." Journal of Applied Polymer Science 97(3): 711-720.

Tsuchida, N. and M. Ueda (1980). "Ionic behaviours in silicone oil." Journal of Physics D: Applied Physics 13(9): 1681.

Inada, T., et al. (2003). "Silicone as a binder in composite electrolytes." Journal of Power Sources 119-121: 948-950.

Kim, G.-D., et al. (1999). "Synthesis and applications of TEOS/PDMS hybrid material by the sol-gel process." Applied Organometallic Chemistry 13(5): 361-372.

Brinker, C. J. (1988). "Hydrolysis and condensation of silicates: Effects on structure." Journal of Non-Crystalline Solids 100(1-3): 31-50.

Shit, S. C. and P. Shah (2013). "A Review on Silicone Rubber." National Academy Science Letters 36(4): 355-365.

Kurono, R. e. a. (2001). "Preparation and characterization of lithium ion conducting borosiloxane polymer electrolytes." Electrochimica Acta(47): 483-487.

Shim, J., et al.(2015). "Polymer composite electrolytes having core-shell silica tillers with anion-trapping boron moiety in the shell layer for all-solid-state lithium-ion batteries." ACS Appl Mater Interfaces 7(14): 7690-7701.

Fujinami, T., et al. (2004). "Proton conducting borosiloxane-poly(ether-sulfone) composite electrolyte." Electrochimica Acta 50(2-3): 627-631.

Garcia, N. (2007). "Use of p-Toluenesulfonic Acid for the Controlled Grafting of alkoxysilanes onto silanol containing surfaces." J Am Chem Soc: 5052-5060.

Wanglee, Y. J., et al. (2012). "Borane-induced dehydration of silica and the ensuing water-catalyzed grafting of B (C6F5)3 to give a supported, single-site Lewis acid, identical withSiOB(C6F5)2." J Am Chem Soc 134(1): 355-366.

Li, X., et al. (2014). "Synthesis of polyborosiloxane and its reversible physical crosslinks." RSC Advances 4(62): 32894.

Seetapan, N., et al. (2013). "Unimodal and bimodal networks of physically crosslinked polyborodimethylsiloxane: viscoelastic and equibiaxial extension behaviors." Journal of Polymer Research 20(7).

D'Elia, E., et al. (2015). "Self-healing graphene-based composites with sensing capabilities." Adv Mater 27(32): 4788-4794.

Wang, Jiantao, W. (2016). "A Mini Review: Nanostructured Silicon-based Materials for Lithium Ion Battery." Nanoscience & Nanotechnology—Asia 6(1): 3.

Zhong, et al., "Nanomaterials in Anodes for Lithium Ion Batteries: Science and Manufacturability." Nanoscience & Nanotechnology—Asia 5(2): (2015) 68.

Li-qiang, Y. (2014). "Research progress in binders of Si-based anodes for Li-ion battery." Dianchi 44(4): 238.

Bernard, L. (2010). "Functions of polymers in composite electrodes of lithium ion batteries." Comptes Rendus Chimie 13(11): 1341.

Jeena, M. T., et al. (2016). "A siloxane-incorporated copolymer as an in situ cross-linkable binder for high performance silicon anodes in Li-ion batteries." Nanoscale 8(17): 9245-9253.

Kim, J.-S., et al. (2014). "Siloxane-capped amorphous nano-SiOx/graphite with improved dispersion ability and battery anode performance." RSC Advances 4(25): 12878.

\* cited by examiner

POLYSILOXANE BINDERS

PRIORITY

This invention claims priority to U.S. Provisional Application Ser. No. 62/363,646 filed Jul. 18, 2016.

GOVERNMENT INTEREST

This invention was made with government support under grant number 1355438 awarded by the National Science Foundation. The government has certain rights in the invention.

TECHNICAL FIELD

The presently-disclosed subject matter generally relates to polymer binders and their use in electrodes. In particular, certain embodiments of the presently-disclosed subject matter relate to polyborosiloxane binders for use with silicon in electrodes of rechargeable batteries.

INTRODUCTION

An increase in demand for energy storage devices with high energy and power densities has motivated researchers to investigate new electrode materials for rechargeable battery technologies. Lithium-ion batteries (LIBs) are preferred for many portable applications due to their high operating voltages, high energy densities, and long cycle lifetimes compared to more traditional battery chemistries such as lead-acid and nickel metal hydride. [1] In efforts to increase the storage capacities of LIBs, new electrode materials have been sought to replace the graphitic anodes utilized in commercial cells. One of the most widely studied candidates to date is silicon (Si), which possesses a theoretical specific capacity (3579 mAh/g for $Li_{15}Si_4$) approximately 10× higher than that of graphite (372 mAh/g for $LiC_6$). However, tailored strategies must be designed to accommodate the inherent 300% volume expansion of Si upon full lithiation, which causes Si to disintegrate. Anodes that comprise metal (or a carbon/metal composite or metal oxide) that alloys with lithium suffer from large volume change upon lithiation/delithiation of the electrode during operation and re-charging of the battery, and continuous cycling irreversibly damages the electrode, resulting in significant capacity loss over short-term cycling.

A variety of tactics have been employed to prevent the severe capacity loss of Si-based anodes during cycling. While unique geometric arrangements of Si particles and binder modifications have resulted in advances in capacity retention over time, modifications have been cost-prohibitive for producing a commercially viable electrode. Among particulates, which are standard for industrial manufacturing methods, bare Si nanoparticles ($Si_{NP}$'s) below ~150 nm in diameter reversibly survive the alloying process, whereas those above this critical limit tend to shatter unless coated by polymers. Coupled with recent advances in reducing the cost of production, $Si_{NP}$'s remain one of the major candidate Si-based anode material.

Addressing the $Si_{NP}$ expansion-contraction process to achieve an Si-based anode material that can accommodate Si volume expansion while retaining capacity in a more facile synthesis would provide significant advantages for anodic materials and secondary batteries.

SUMMARY

A variety of tactics have been employed to prevent the severe capacity loss of Si-based anodes during cycling. While unique geometric arrangements of Si particles and binder modifications have resulted in advances in capacity retention over time, modifications have been cost-prohibitive for producing a commercially viable electrode. Among particulates, which are standard for industrial manufacturing methods, bare Si nanoparticles (SiNP's) below ~150 nm in diameter reversibly survive the alloying process, whereas those above this critical limit tend to shatter unless coated by polymers. Coupled with recent advances in reducing the cost of production, SiNP's remain one of the major candidate Si-based anode material.

Addressing the SiNP expansion-contraction process to achieve an Si-based anode material that can accommodate Si volume expansion while retaining capacity in a more facile synthesis would provide significant advantages for anodic materials and secondary batteries.

SUMMARY

As reported herein, the inherent issues of SiNP anodes are tackled fundamentally through the use of a self-healing binder containing boric acid and a tri-functional silyl ether, optionally with polydimethyl sioloxane (PDMS) which are inexpensive and effective binders. The most highly cross-linked binders presently-disclosed approach coulombic efficiencies of 100% after 200 cycles.

The presently disclosed subject matter includes an electrode for a rechargeable battery that includes silicon and a crosslinked siloxane binder. In some embodiments, the polysiloxane binder is a polyborosiloxane. In some embodiments, the polysiloxane binder is crosslinked from a crosslinker or a mixture of crosslinkers. In some embodiments, the polyborosiloxane binder is crosslinked from the crosslinkers triethoxyphenylsilane (TEPS) or boric acid or a mixture thereof. In some embodiments, the polyborosiloxane binder optionally includes polydimethylsiloxane (PDMS). In some embodiments, the binder includes crosslinkers in an amount from 10-50 wt % (of the total weight of the polyborosiloxane binder).

In some embodiments, the polyborosiloxane binder comprises a mass % of TEPS:boric acid of 80:20. In another embodiment, the polyborosiloxane binder comprises a mass % of PDMS of about 50% to 92.5%, TEPS of about 0% to 30%, and boric acid of about 5% to 20%, in some embodiments, the binder comprises a mass % of PDMS:TEPS:boric acid of 50:30:20.

The preparation of the electrode can, in some embodiments, be prepared from a slurry of silicon particles, carbon black and polyborosiloxane binder. In some embodiments, the silicon particle is a silicon nanoparticle or a silicon microparticle. In some embodiments, the slurry comprises a silicon nanoparticle:carbon black:binder mass ratio of 3:1:1. The silicon nanoparticles can have a 30-50 nm average particle size, but can vary between nanoparticle and microparticle size, choosing particle size according to performance needs, ease of use and cost. In some embodiments, the slurry comprises the solvent diglyme. In some embodiments, the binder is provided as a solution in a solvent, which in some instances, is tetrohydrofuran (THF). In some embodiments, the binder is provided in solution at less than 15 wt %, but the binder mass ratio is calculated based solely on the weight of the binder, not inclusive of the solvent in which it is provided.

In some embodiments, preparation of the electrode includes curing the electrode in a vacuum oven. In some embodiments, the electrode is cured in a vacuum oven, in some embodiments, the curing is performed for 24 hours of more and/or at about 135° C. In some embodiments, the electrode is prepared from a slurry that includes a mixture of TEPS and boric acid provided as monomers that are cure polymerized at the same time the electrode is cured.

Rechargeable batteries comprising the electrodes of the presently disclosed subject matter are also envisioned. In some embodiments, the rechargeable battery has a coulombic efficiency greater than about 95% after 200 cycles, and a specific charge capacity of greater than about 2000 mAh/g.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently disclosed subject-matter includes an electrode for a rechargeable battery, such as a lithium ion battery or a sodium ion battery, comprising silicon and a polysiloxane binder. In some embodiments, the electrode includes a crosslinked polyborosiloxane, prepared as described herein. The presently disclosed invention includes a rechargeable battery, such as a lithium ion battery or a sodium ion battery, having improved capacity retention, comprising an anode that includes silicon and a polyborosiloxane binder.

As reported herein, the inherent issues of SiNP anodes are tackled fundamentally through the use of a self-healing binder containing boric acid and a tri-functional silyl ether, optionally with polydimethyl siloxane (PDMS) which are inexpensive and effective binders. The most highly crosslinked binders presently-disclosed approach coulombic efficiencies of 100% after 200 cycles. As well-known in the art, extreme temperatures, over-charging or over-discharging can accelerate capacity loss in rechargeable batteries.

The presently disclosed subject matter includes an electrode for a rechargeable battery that includes silicon and a polysiloxane binder. In some embodiments, the polysiloxane binder is crosslinked from a mixture of the crosslinkers triethoxyphenylsilane (TEPS) and boric acid. In some embodiments, the polyborosiloxane binder optionally includes polydimethylsiloxane (PDMS),In some embodiments, the binder includes crosslinkers in an amount from 10-50 wt % (of the total weight of the polyborosiloxane binder).

In some embodiments, the polyborosiloxane binder comprises a mass % of TEPS:boric acid of 80:20. In another embodiment, the polyborosiloxane binder comprises a mass % of PDMS of about 50% to 92.5%, TEPS of about 0% to 30%, and boric acid of about 5% to 20%, in some embodiments, the binder comprises a mass % of PDMS:TEPS:boric acid of 50:30:20.

The preparation of the electrode can, in some embodiments, be prepared from a slurry of silicon nanoparticles, carbon black and polyborosiloxane binder. In some embodiments, the slurry comprises a silicon nanoparticle:carbon black:binder mass ratio of 3:1:1.

The electrodes prepared as disclosed herein can include silicon particles. In some instances, the silicon particles are nanoparticles or microparticles, range from about 1 nm to about 1 mm. In some embodiments, the silicon nanoparticles have a 30-50 nm average particle size. In some embodiments, the slurry comprises the solvent diglyme. In some embodiments, the binder is provided as a solution in tetrohydrofuran. In some embodiments, the binder is provided in solution at less than 15 wt %.

In some embodiments, the electrode is prepared from a slurry that includes a mixture of TEPS and boric acid. In some embodiments, the electrode is cured in a vacuum oven. In some embodiments, the curing is performed for 24 hours or more and/or at about 130° C. to about 150° C., in some instances at about 135° C. In some embodiments, preparation of the electrode includes curing the electrode in a vacuum oven. In preferred embodiments, the electrode is cured in ambient atmosphere. In other embodiments the gas is inert, and is selected from nitrogen and argon.

Rechargeable battery comprising the electrodes of the presently disclosed subject matter are also envisioned. In some embodiments, the rechargeable battery has a coulombic efficiency greater than about 95% after 200 cycles. In some embodiments the specific capacity is greater than about 1500 mAh/g, 2000 mAh/g, 2500 mAh/g or about 3000 mAh/g at 100 cycles.

Coulombic efficiency describes the charge ratio during discharging and charging, and is considered a good indicator of the relative lifetime of a battery. Coulombic efficiency, then, is the amount of charge exiting the battery during the discharge step divided by the amount of charge entering the battery during the charge step.

Polyborosiloxane is a polysiloxane with some of the silicon atoms replaced by boron atoms, i.e. a copolymer containing both siloxane (a Si—O—Si linkage) and boron metalloxane units, creating a backbone chain comprising silicon, boron and oxygen atoms with carbon side chains bonded to the silicon. Upon formation, the material can be used as a binder, a material that when used in preparation of the anode, can accommodate volume change of the anode upon lithiation/delithiation of the electrode during operation and re-charging of a battery. In some instances, the materials disclosed herein can be described as a boron-modified ormosil, an organically modified silicate which is modified with boron atoms.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

Following long-standing patent law convention, the terms "a", "an", and "the" refer to "one or more" when used in this application, including the claims.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

EXAMPLES

To address the SiNP expansion/contraction process boron-containing cross-linked silicone polymers present as an excellent and unexplored candidate for design. While electrically insulating as pure materials, silicone rubbers may be made electronically conductive by blending with a variety of materials, including carbon black (CB), their oils and resins demonstrate ionic conductivity, allow extensively studied, diverse functionality, and may be prepared through a wide variety of methods. The modification of silicones with neutral boron compounds allow high lithium-ion and proton conductivity in solid systems, adds three-dimensionality to otherwise linear systems through boron's ability to form three bonds, and each interact favorably, and furthermore may be used to functionalize $SiO_2$ surfaces.

Boron-modified silicones are intrinsically self-healing materials by way of viscoelasticity. Viscoelastic materials can reversibly deform by way of molecularly rearrangement, acting as solid when force is applied over short time scales (i.e. outside the elastic domain), and as a liquid when force is applied over long time scales (i.e. inside the elastic domain). In these particular systems, the ability to flow is related to boron's reversible complexation with neighboring oxygens in a siloxane chain, coupled with the silicon-oxygen bond's low energetic barrier for rotation when compared to carbon-oxygen bonds.

In this study, the inherent issues of SiNP anodes are tackled fundamentally through the use of a self-healing binder. A survey where PDMS is variably cross-linked by boric acid and a tri-functional silyl ether are presented as novel, inexpensive, and effective binders, where the most highly cross-linked binders approach coulombic efficiencies of 100% after 200 cycles.

Example 1A

Polymers were synthesized via condensation reactions from a linear polymer, polysiloxane, and one or two cross-linking agents, TEPS and $B(OH)_3$, depicted below.

poylsiloxane

TEPS          B(OH)₃ cross-linkers

As provided in Table 1, polymers of varying amounts of linear polymer, cross-linker a, TEPS, and cross-linker b, B(OH)₃, were prepared.

TABLE 1

Polymer Synthesis for 1a-3b

| Polymer | Linear polymer (mass %) | Cross-linker a (mass %) | Cross-linker b (mass %) |
|---|---|---|---|
| 1a | 100 | — | — |
| 1b | 92.5 | — | 7.5 |
| 1c | 90 | — | 10 |
| 2a | 90 | 5 | 5 |
| 2b | 80 | 10 | 10 |
| 2c | 50 | 30 | 20 |
| 3a | — | 80 | 20 |
| 3b* | — | 80 | 20 |

*Cure-polymerized from monomers

Materials: Dichlorodimethylsilane (99%), boric acid (99.99%), and triethoxyphenylsilane (98%) were purchased from Alfa Aesar. Diglyme (>99.0%, no inhibitor) was purchase from TCI. Ethanol and dichloromethane (ACS grade) were purchased from Macron. Tetrahydrofuran was purchased from Acros Organics. Silicon nanoparticles of 30-50 nm average particle size were purchased from Nanoamor. Super65 carbon black was purchased from Timical. Battery grade LiPF$_6$, EC, EMC, and FEC were purchased from BASF.

1a. Polydimethylsiloxane (PDMS) synthesis: 95 mL of Alfa Aesar dichlorodimethyl silane (99%) was combined with 180 mL of Macron dichloromethane (DCM) (ACS grade) in a 500 mL round bottom flask, which was immersed in an ice bath. To the flask, 180 mL of ultrapure Millipore water was added dropwise over 30 minutes. 100 mL of concentrated Na2CO3 aqueous solution was added dropwise in order to partially neutralize the solution. The resulting two phase solution was separated, and the organic layer was reserved. Extractions (3×20 mL) with DCM were performed of the aqueous portion to gather siloxane condensates, and these were combined with the previously reserved organic phase. The combined organic materials were then returned to a clean separatory funnel, and the organic layer was washed by the addition of 2×50 mL concentrated aqueous Na$_2$CO$_3$ washes, followed by a wash of 2×50 mL of H$_2$O. The organic layer was isolated and then filtered through a medium fritted funnel, concentrated by rotary evaporator, and the final isolated oil was dried in the vacuum at 60° C. overnight.

PBS Derivative Synthesis:

1b. 7.5% B(OH)₃ PBS Synthesis: 4.527 g of PDMS 1awas combined with 0.3392 g of B(OH)₃ in a conical flask, and hexanes were used to pool the reagents to the bottom. This was brought to 195° C. while stirring and held for 6+ hours.

1c. 10% B(OH)₃ PBS Synthesis: 5.715 g PDMS 1awas combined with 0.573 g of B(OH)₃ in 15 mL hexanes (to reduce viscosity) and stirred in a stoppered pear-shaped flask for ~30 min to pulverize and disperse the solid boric acid. The stopper was then removed, and the mixture was brought slowly to 200° C., and held at this temperature for 6 hours. The viscous, solid material was then dissolved and stored in hexanes for several days to precipitate excess B(OH)₃. This was filtered, and hexanes was again until no B(OH)₃ precipitated. The solution was then concentrated by rotary evaporator, and dried in the vacuum oven overnight at 60° C. The viscoelastic solid was finally stored again in hexanes. Final yield: 4.893 g.

2a. 90:5:5 PDMS:TEPS:B(OH)₃: 0.1577 g of B(OH)₃, 2.858 g of PDMS, and 0.171 g of TEPS was added to a conical 50 mL flask with an oversized stir bar and brought to 190° C. over 1 hour, and held for 14 h in open air. The resulting solid was dissolved in hexanes, filtered, and rotovapped and dried at 70° C. in the vacuum oven overnight. Final yield: 1.8116 g (56.8%)

2b. 80:10:10 PDMS:TEPS:B(OH)₃: 0.2609 g of B(OH)₃, 2.0855 g of PDMS, and 0.2671 g of TEPS utilized in the same procedure as 90:5:5. Final yield: 1.446 g (55.3%).

2c. 50:30:20 PDMS:TEPS:B(OH)₃: 0.5435 g of B(OH)₃, 1.3628 g of PDMS, and 0.8139 g of TEPS utilized in the same procedure as 90:5:5. Final yield: 1.619 g (59.5%).

Solutions of the derivatives were made by refluxing in THF. Saturated solutions were dilute; below 15 wt %.

3a. 0:80:20 PDMS:TEPS:B B(OH)₃: 0.894 g (14.5 mmol) of boric acid (99.99%, Alfa Aesar) was combined with 3.480 g (14.5 mmol) of TEPS (98%, Alfa Aesar) in a 50 mL conical flask. 5 mL of EtOH was added to collect reagents to the flask's bottom. Over 2 hours, this mixture was brought to 150° C. and held at this temperature for 24 hours. Dissolution of boric acid into the liquid mixture was noted at 120° C., followed by solidification at 130° C. The solid product was reserved. To remove potentially unreacted alkoxy silyl, silanol, and B—OH groups, THF was added. This penetrated the solid resin as the temperature was slowly brought to 150° C. again until the solvent evaporated, over ~2 hours. The temperature was increased to 190° C. over 4 hours until the smell of ethanol could not be detected. The final material was dissolved in THF, filtered to remove insoluble particulates and stored as a 7.14% solution.

3b. 0:80:20 PDMS:TEPS:B(OH)₃-CURE-POLYMERIZED: These electrodes were prepared in the manner described below, in electrode preparation, save the inclusion of a pre-prepared binder. In contrast, these slurries included the monomers TEPS and B(OH)₃ in the slurry mixture, which polymerized upon curing in the vacuum oven, as described.

Figure 1:
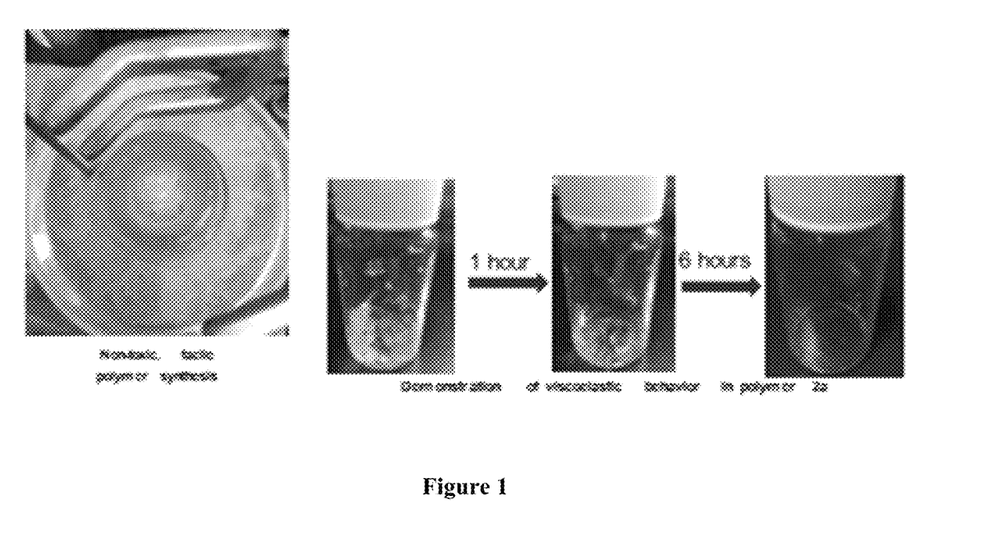
FIG. 1 includes images of the open-air synthesis of exemplary polymer binders.

The polymers vary from transparent, viscoelastic slow-flowing solids (FIG. 1) to white powders that did not appear to flow. As can be seen in FIG. 1, the products are non-toxic and synthesis can be performed in open air.

Example 1B

Preparation of polymers 2-5: Preparation of PDMS, annotated here as polymer 1, was prepared as described in Example 1A. In the following experiment, Polymer 1, B(OH)₃, and TEPS were added to a conical 50 mL flask with an oversized stir bar and brought to 190° C. over 1 h, then held for 14 h in open air. The resulting solid was dissolved in hexanes, filtered, and concentrated by rotary evaporation, then dried in a vacuum oven at 70° C. overnight.

TABLE 2

Polymer Synthesis for Polymers 2-5

| Polymer | Linear polymer PDMS (mass) | Cross-linker a TEPS (mass) | Cross-linker b B(OH)$_3$ (mass) |
|---|---|---|---|
| 2 | 2.858 g | 0.171 g | 0.157 g |
| 3 | 2.086 g | 0.267 g | 0.261 g |
| 4 | 1.363 g | 0.814 g | 0.544 g |
| 5 | — | 3.48 g | 0.894 g |

Polymer 2 (90% polysiloxane, 5% B(OH)$_3$, 5% TEPS). 2.858 g Polymer 1a, 0.157 g B(OH)$_3$, 0.171 g TEPS. Yield: 1.812 g (56.8%).

Polymer 3 (80% polysiloxane, 10% B(OH)$_3$, 10% TEPS). 2.086 g Polymer 1a, 0.0.261 g B(OH)$_3$, 0.267 g TEPS. Yield: 1.446 g (55.3%).

Polymer 4 (50% polysiloxane, 20% B(OH)$_3$, 30% TEPS). 1.363 g Polymer 1a, 0.544 g B(OH)$_3$, 0.814 g TEPS. Yield: 1.619 g (59.5%).

Preparation of Ormosil Binder (Polymer 5) (80% B(OH)$_3$, 20% TEPS):Boric acid (0.894 g, 14.5 mmol) was combined with triethoxyphenylsilane (3.48 g, 14.5 mmol) of TEPS in a 50 mL conical flask. EtOH (4 mL) was added and the reaction flask was immersed in a sand bath which was raised to 150° C. over the course of 2 h, then held at this temperature for an additional 24 h. Dissolution of boric acid was noted at 120° C., followed by solidification at 130° C. After removing the reaction flask from the oil bath the solid product was stored in the reaction flask for one day at ambient temperature after which THF (50 mL) was added. This penetrated the solid resin as the temperature was slowly brought to 150° C. by again immersing the flask in the sand bath during which time the solvent evaporated, over ~2 h. The temperature was increased to 190° C. over 4 h. The final material was dissolved in THF (~50 mL), and solids were removed by filtration through a coarse fritted funnel. The product, a white solid, was stored as a 7.14 wt. % solution in THF.

Example 2: Electrode Preparation

Figure 2:
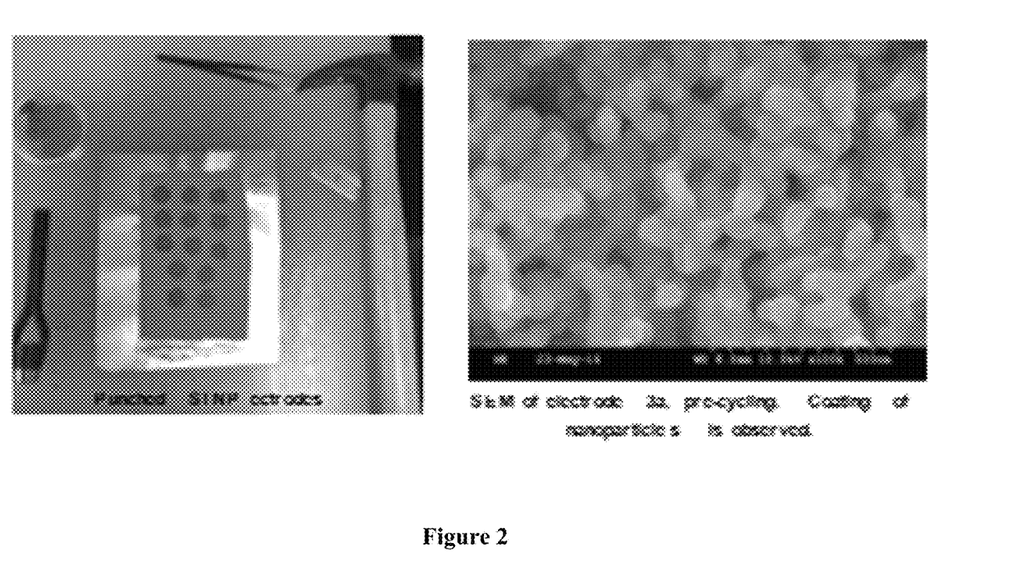
FIG. 2 includes images of punched SiNPelectrodes (left) and scanning electron microscopy of formulation 3a precycling where the coating of nanoparticles is observed.

Slurry solids were composed of a 3:1:1 mass ratio of silicon nanoparticles (30-50 nm avg particle size, 98% purity) to Timical Super65 carbon black to the above binder solution, where diglyme (TCI, >99.0%, no inhibitor) was used as the slurry's dispersive solvent. Homogenous suspensions of the above were prepared in scintillation vials by 5 hours of magnetic stirring in conjunction with periodic, 3×(5 minute) sonication. This suspension was cast onto copper foil and was spread with a doctor blade set at 50 micrometers, allowed to dry for 24 hours at atmospheric conditions, and cured over 24 hours in a vacuum oven at 135° C. Electrodes were punched by 14 mm die-cut lever press and immediately transferred to an argon-atmosphere glove box (FIG. 2).

Example 3: Cycling Performance

Half-Cell Construction:
Half cells were prepared with 9/16" discs of lithium, and 10/16" separators. These 2032 coin cells were constructed in a glovebox under atmosphere of argon, with H$_2$O and O$_2$ levels kept <1.5 ppm. 65 μL of electrolyte (1M LiPF$_6$ in a 5:4:1 EMC:EC:FEC mass ratio solution) was used as the electrolye for each half cell. QA celgard PP/PE/PP was used as a trilayer separator.

Constant Rate Cycling Protocol:
Following construction, electrolyte was allowed to wet the half cells over 2 hours prior to cycling. These were then cycled at a c/10 rate, in a Landt CT2001A cycler, voltage window of 0.01 V to 1.5 V, with a rest time of 5 min allowed between charge and discharge. A current range of 167-169 μA was used, determined by basing the capacity of the cell on the mass of silicon only (assumed 60% of final electrode mass) at a theoretical capacity of 3000 mAh/g.

Variable Rate Cycling Protocol:
After an initial 2 h wetting/resting period, half cells were initially cycled at C/20 rates for five cycles prior to performing a rate-step experiment in order to form a stable SEI formation. Following these first 5 cycles, the rate was altered every 3 cycles from C/10, C/5, C/2, C, 2C, and finally back to C/10 for both rate studies.

Characterization:
SEM images were obtained using a Hitachi S-900 instrument. IR data was obtained from a Thermo-Scientific Nicolet 6700 FT-IR equipped with a smart iTR diamond-attenuated total reflectance sampling accessory, using 25 scans.

DISCUSSION

Polysiloxane was prepared in house by reaction of dichlorodimethylsilane with water in dichloromethane, with concentrated aqueous sodium carbonate added to partially neutralize the solution. The resultant polymer was used to create cross-linked polyborosiloxanes using both boronic acid (B(OH)$_3$) and TEPS as cross-linkers. In one case, the linear polymer was not utilized, and only boronic acid and triethoxyphenylsilane were combined. In this latter case, the material is better described as a boron-modified ormosil, an organically modified silicate, with a weight ratio equivalent to a 1:1 molar ratio of B(OH)$_3$:TEPS.

The prepared polymers were combined with SiNPs and carbon black in a 1:3:1 weight ratio and dispersed into diglyme before casting onto copper foils to prepare electrode films. Electrodes were cured in a vacuum oven at a temperature of 130 to 140° C. for 16 to 24 h. Half cells were prepared by pairing 9/16" lithium discs with 10/16" punched SiNP electrode films in 2320 coin cells containing a 1 M solution of LiPF$_6$ in EMC/EC/FEC (5:4:1) as the electrolyte. Prior to cycling, all cells were given a 2 h rest period. Cycling was performed at a rate of C/10, which was calculated assuming that the final mass of the electrodes contained the original 1:3:1 mass ratio of polymer:SiNPs:carbon black.

Figure 6A:
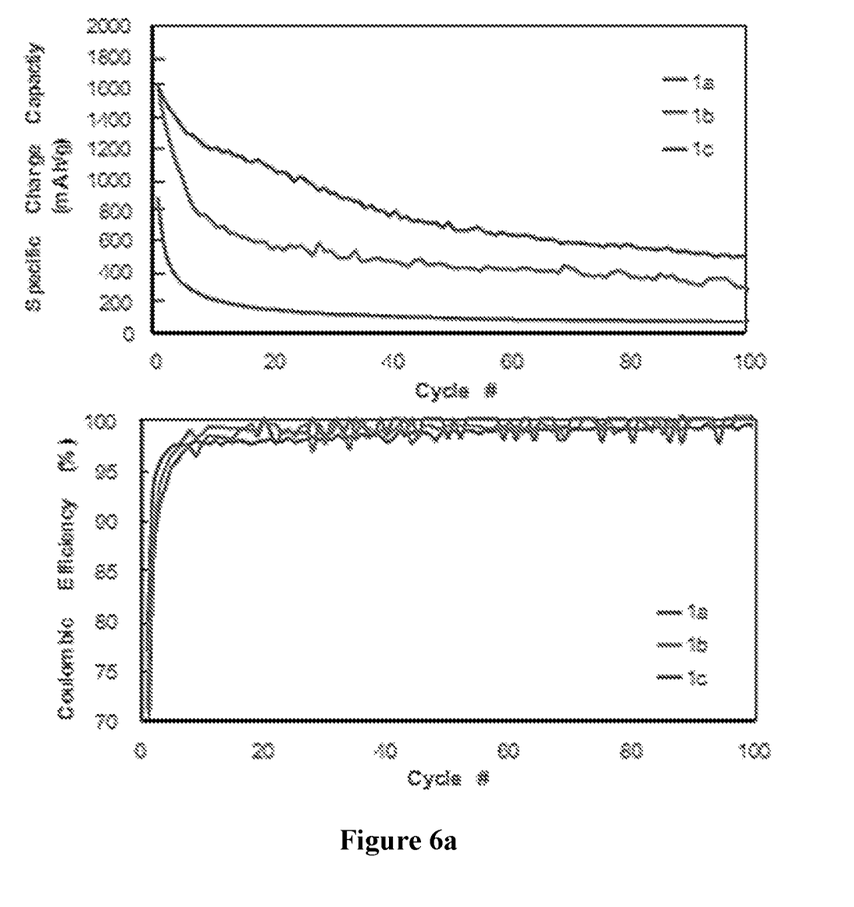
FIG. 6a includes the specific capacity and coulombic efficiency measurements over 100 cycles for PDMS (1a), 7.5% PBS (1b), and 10% PBS (1c) as binders.
Figure 6B:
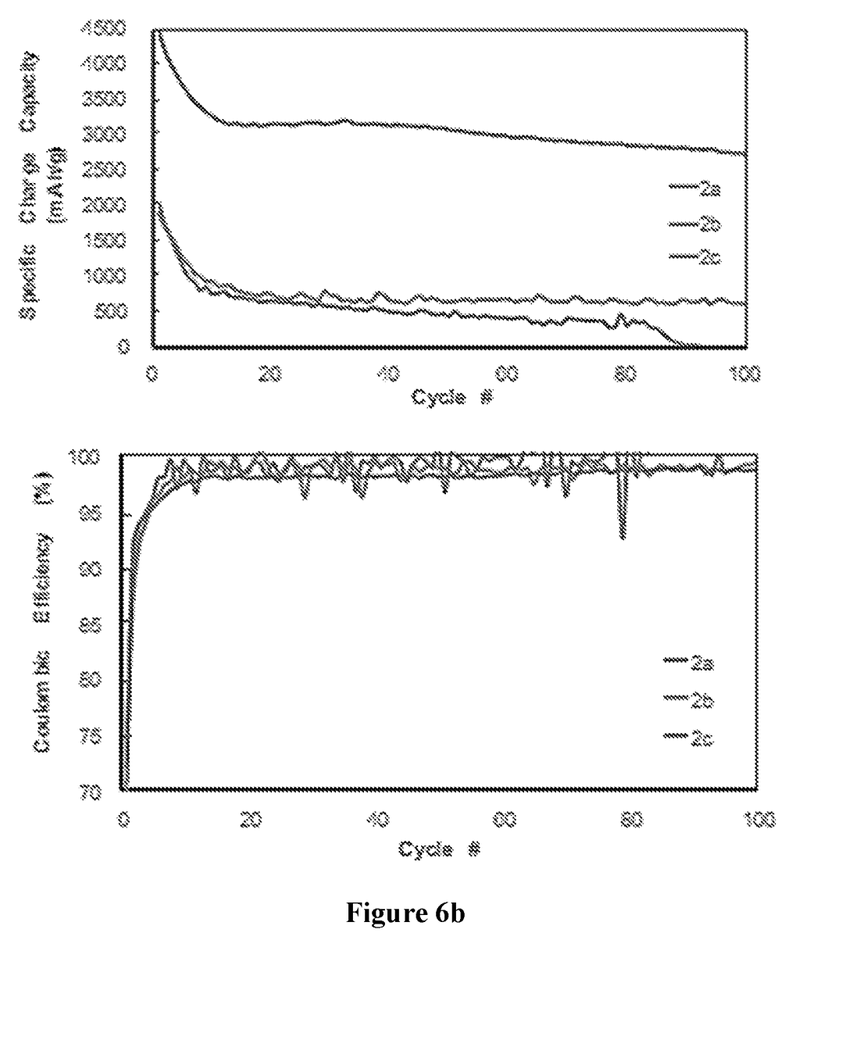
FIG. 6b includes the specific capacity and coulombic efficiency measurements over 100 cycles for PDMS:TEPS:B(OH)$_3$ binders with a weight % of 90:5:5 (2a), 80:10:10 (2b), and 50:30:20 (2c) PDMS:TEPS:B(OH)$_3$ as binders.
Figure 6C:
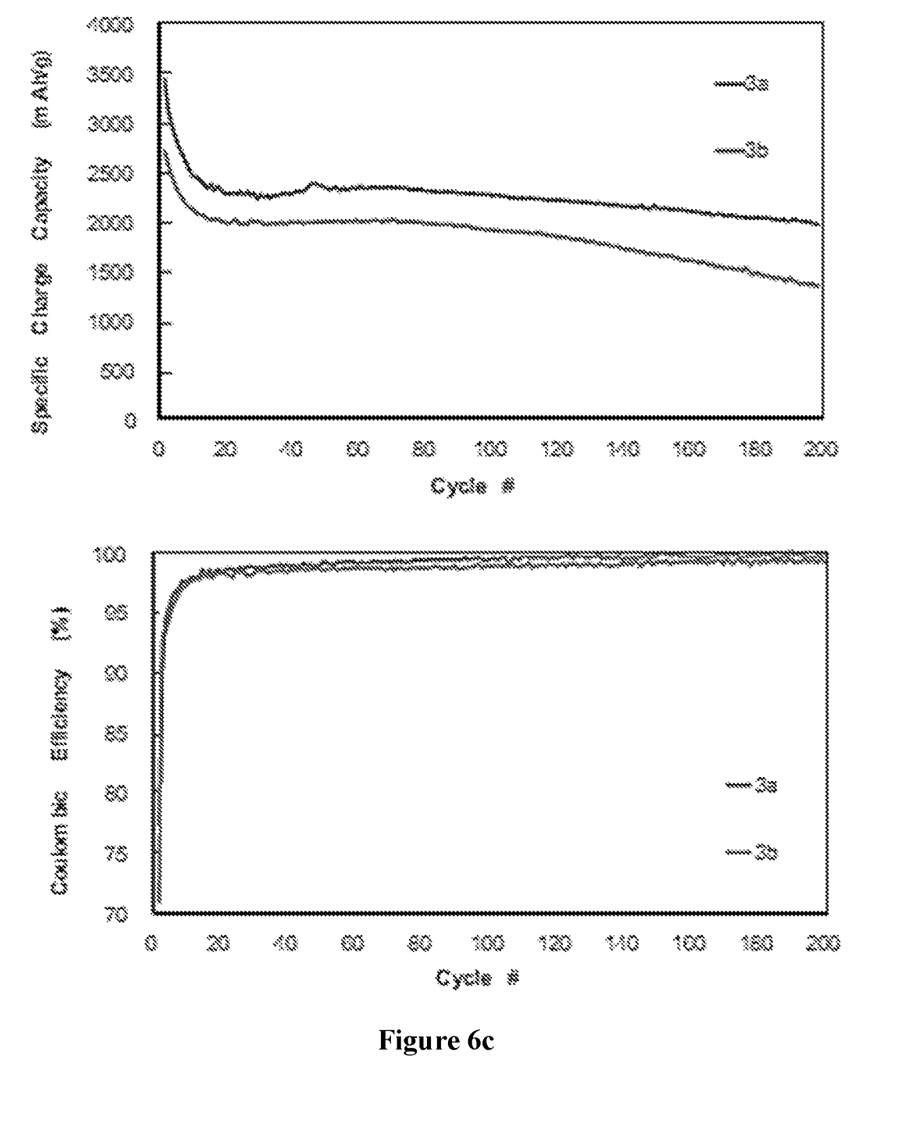
FIG. 6c includes the specific capacity and coulombic efficiency measurements over 200 cycles of 0:80:20 PDMS:TEPS:B(OH)$_3$ with two different preparation methods: pre-prepared binder included in anode slurry preparation (3a); and monomers included in the anode slurry preparation that were subsequently cure polymerized (3b).

As shown in FIG. 6a, the cycling performance of the least cross-linked, most flexible polymers, namely 1a, 1b and 1c were significantly lower than theoretical value. Without being bound by theory, it is possible binder dissolution into the electrolyte, and thereby disconnection of the active material, resulted in the low capacities. In FIG. 6b, polymers 2a, 2b and 2c, in which the amount of cross-linker ranged from 10-50%, resulted in higher cross-linked binders yielding electrode with higher capacities. When the mass of cross-linkers equals that of the linear polymer, a significant jump in specific capacity and capacity retention occurs. Finally, in FIG. 6c, the most highly cross-linked polymers were analyzed, polymers 3a and 3b, made from tri-functional cross-linking agents with no linear polymer. In this set, the capacities of the electrodes in the cells approach the theoretical value for Si, with capacity retention of over 200+ cycles. Here, the columbic efficiencies are nearly ideal. Without being bound by theory, it is possible the reduced capacity of 3b may result from the solid-state polymerization performed in the presence of CB and SiNP. The polymerization releases gaseous products, which may increase the porosity of the electrode, facilitating early cycling loss of electrode material during SEI formation.

Figure 3:
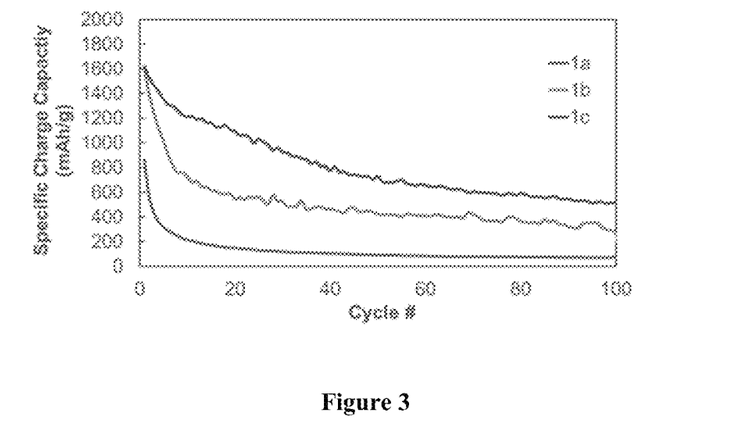
FIG. 3 includes the specific charge capacity of PDMS (1a), 7.5% PBS (1b), and 10% PBS (1c) binders in silicon anode half-cells.
Figure 4:
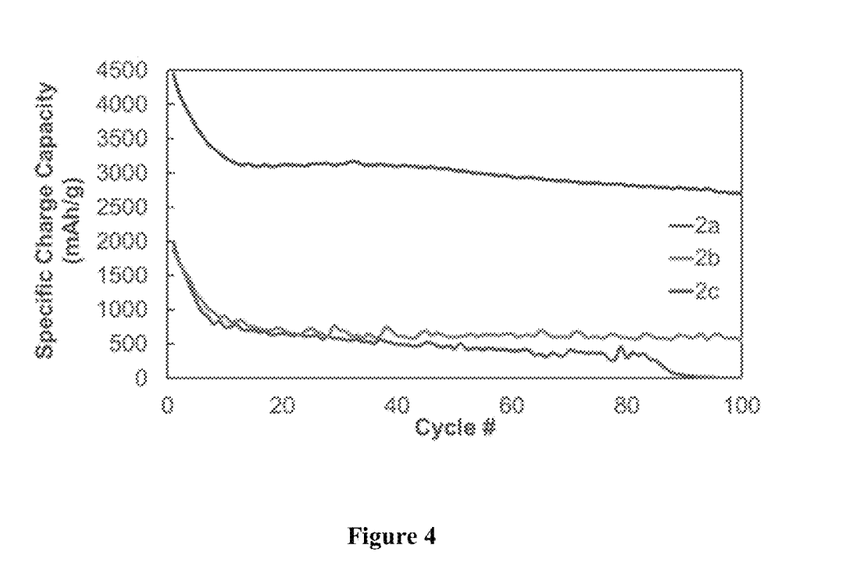
FIG. 4 includes the specific charge capacity of PDMS:TEPS:B(OH)$_3$ binders with a weight % of 90:5:5 (2a), 80:10:10 (2b), and 50:30:20 (2c) PDMS:TEPS:B(OH)$_3$ in silicon anode half-cells.

FIGS. 3 and 4 demonstrate viability of material as a binder, especially in the stable cycling of 50:30:20 (2c). Unlike binders used in literature examples in silicon-only anode half cells, cycling appears to level to >95% coulombic efficiency across many compositions, even those where cross-linking using TEPS is low.

Figure 5:
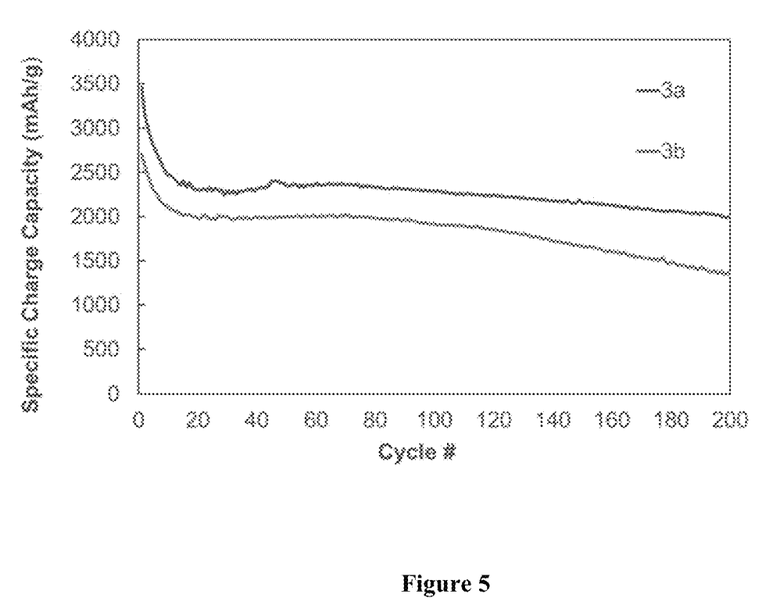
FIG. 5 includes the specific charge capacity of 0:80:20 PDMS:TEPS:B(OH)$_3$ with two different preparation methods: pre-prepared binder included in anode slurry preparation (3a); and monomers included in the anode slurry preparation that were subsequently cure polymerized (3b) in silicon anode half-cells.

FIG. 5 demonstrates the most highly cross-linked binders, where 3a was prepared in the method described above, and 3b was cure-polymerized, as described in the experimental section. These half-cells demonstrate unparalleled coulombic efficiency when compared with other SiNP-only anode half-cells when compared with literature examples.

Figure 7A:
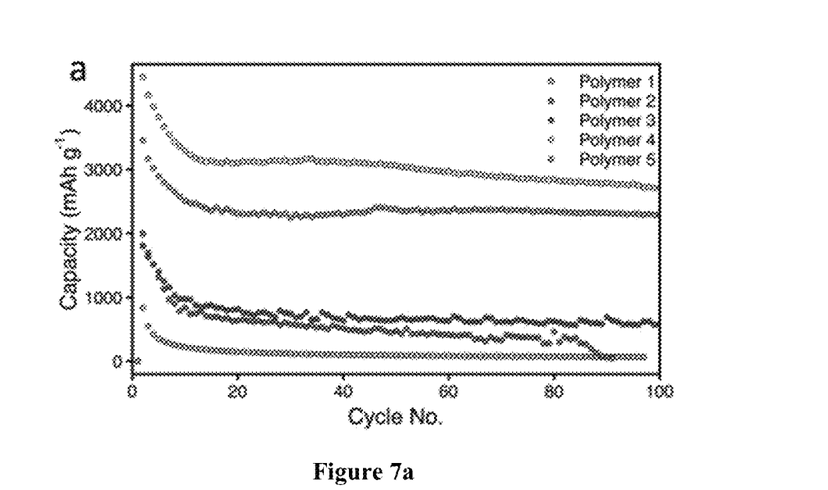
FIGS. 7a-7b chart (a) the charge capacities and (b) coulombic efficiencies of a Li half-cell with a Si-containing electrode comprised of 1:3:1 ratio of binder:SiNP:carbon black, cycled at a rate of C/10.
Figure 7B:
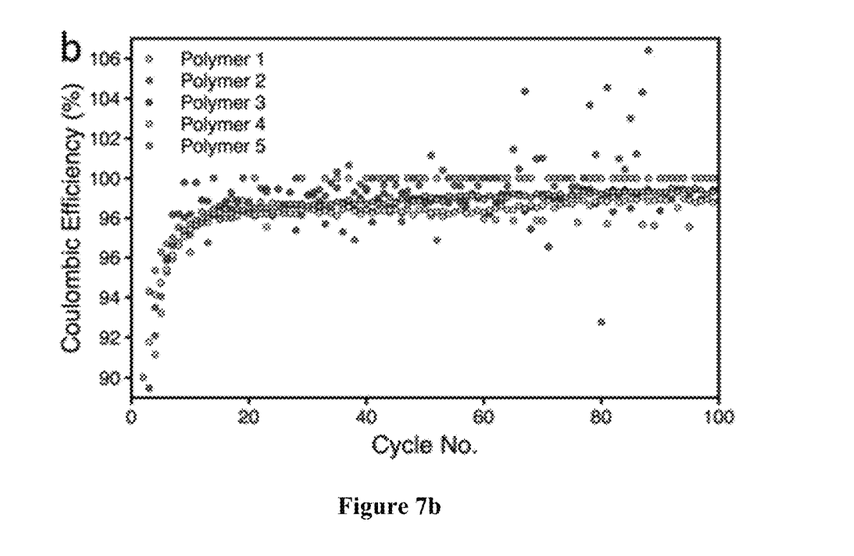

Charge capacities and columbic efficiencies for the first hundred cycles of Polymers 1-5 from Example 1B are shown in FIG. 7. For the linear polysiloxane (1) and the least cross-linked polyborosiloxanes (2 and 3), the initial capacities are the lowest. The electrode containing the linear polymer 1 fades rapidly, and after fewer than 10 cycles, the cross-linked polymers 2 and 3 have capacities below 1000 mAh $g^{-1}$. The more highly cross-linked polyborosiloxane (4) shows the highest capacity initially, which drops to just under 3000 mAh $g^{-1}$ at one hundred cycles. Further intriguing, though, was that the cross-linked ormosil binder (5) showed little capacity fade starting at around cycle 20. Additionally, its coulombic efficiency continued to rise as cycling progressed. These results motivated further analysis of polymer 5.

Figure 8:
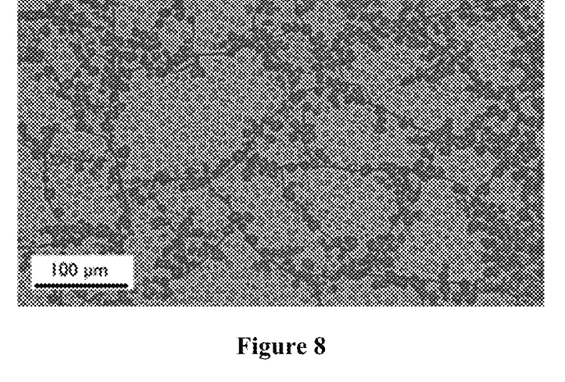
FIG. 8 includes an optical microscope image of a film of polymer 5 after allowing it to dry from a solution in tetrahydrofuran (THF).

Again, polymer 5 is simply a combination of B(OH)$_3$ and TEPS in a 1:1 molar ratio, which is prepared from heating the two reactants in ethanol. Unlike the polyborosiloxanes, which are transparent or translucent colorless gels, the ormosil is a white solid with no apparent flowable characteristics. As prepared, PBS-11 is presumed to be a collection of oligomers and polymers with a wide distribution of molecular weights, where solid-state synthesis prevents complete condensation of Si—OH and B—OH groups. A high degree of cross-linking is considered to retard the viscoelastic flow normally associated with this class of materials, which was evidenced by a lack of apparent macroscopic flow over several days. Under optical microscope, thin films of PBS-11 deposited on microscope slides demonstrated crack-filling over day-long time scales (FIG. 8), but complete homogenization of the material was never achieved.

Figure 9:
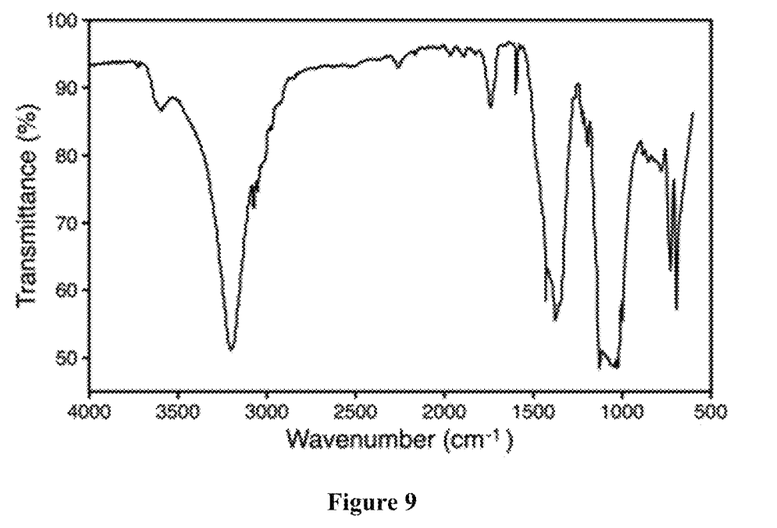
FIG. 9 is the infrared spectrum of polymer 5, resulting from the reaction of B(OH)$_3$ and TEPS in a 1:1 molar ratio.

IR spectroscopy was performed to determine if expected bonds were present. The peaks present in the IR spectrum (FIG. 9) are consistent with the positions of expected peaks. The intense absorbance spanning ca. 1000-1150 $cm^{-1}$ is positioned consistent with Si—O—Si and B—O—H in-plane bending, expected at 1130-1000 $cm^{-1}$ and 1150 $cm^{-1}$. A strong peak spanning ca. 1300 to 1500 $cm^{-1}$ with maximum intensity at 1375 $cm^{-1}$ may contain Si—O—B and B—O—B moieties, expected at 1340 $cm^{-1}$ and 1380 $cm^{-1}$, respectively. The less intense peak at 1740 $cm^{-1}$ are consistent with the position of C=C bending in an aromatic ring, and the sharp peaks between 3000 and 3100 $cm^{-1}$ are consistent with the position of aromatic C—H stretches, both of which are consistent with the presence of a phenyl ring. The small peaks just below 3000 $cm^{-1}$ could arise from $sp^3$-hybridized C—H stretches from residual ethoxy groups. Finally, the intense broad peak centered at ca. 3200 $cm^{-1}$ is consistent with O—H stretches that would arise from a B—O—H arrangement; other peaks at 3200 $cm^{-1}$ and higher could correspond with additional O—H stretches such as that from Si—O—H and H$_2$O.

Figure 10A:
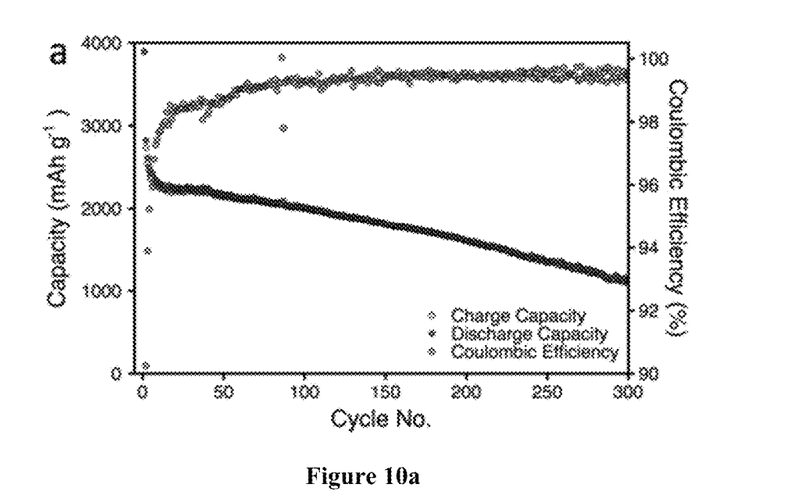
FIGS. 10a-10c include plots of (a) Charge and discharge capacity of a Li half cell containing PBS-11-based SiNP electrodes, and coulombic efficiency for each cycle; (b) Voltage vs. capacity plots for the cell from plot (a); and (c) Rate study for an equivalent electrode in a Li half-cell.
Figure 10B:
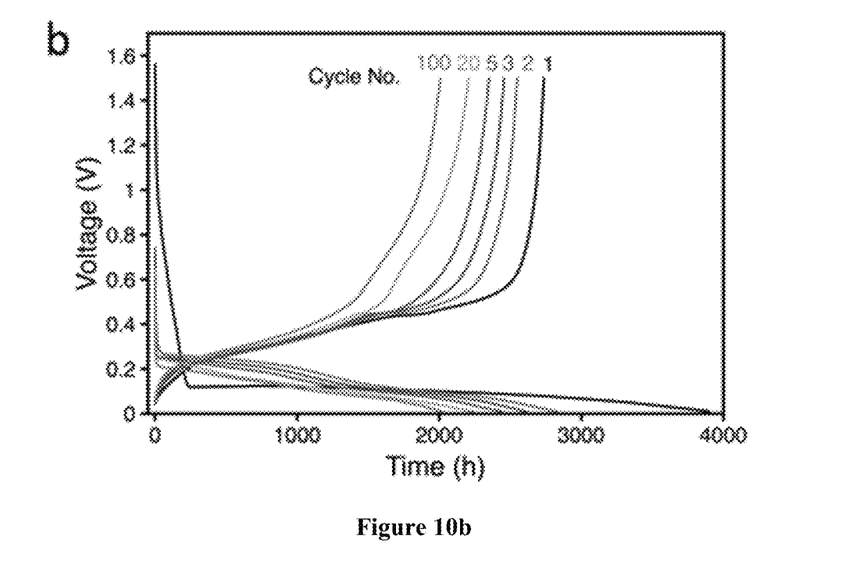
Figure 10C:
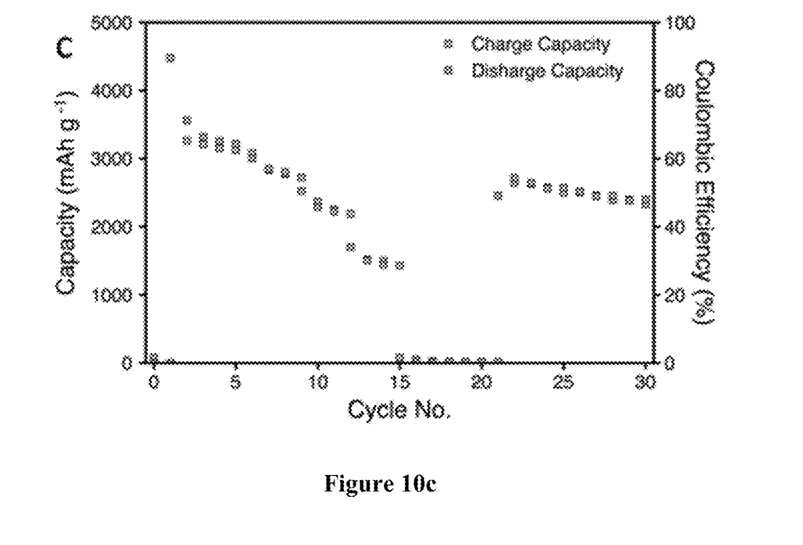

Further cycling of polymer 5 in lithium half cells showed some variability in the initial capacity of the silicon-based electrode. A representative example of cycling performance of electrodes containing polymer 5 at a rate of C-10 is shown in FIG. 10a. Cycling data show impressive performance, including the achievement of 99% coulombic efficiency after ~10 cycles following rapid initial capacity loss. This initial irreversible capacity loss is associated with the consumption of residual —OH groups present in the binder, and the high capacity retention observed is associated with three-dimensional network that encases CB and Si NPs, keeping them in close contact. In the voltage vs. time profiles shown in FIG. 10b, a striking preservation of capacity is observed. Results from multiple coin cells show similar capacity values and trends in fade. A rate study was performed as shown in FIG. 10c. First half cells were cycled at a rate of C/20 for 5 cycles to allow for the stable SEI formation. Following these first 5 cycles, the rate was altered every 3 cycles from C/10, C/5, C/2, C, 2C, and finally back to C/10 for ten cycles. After a decline in capacity for the faster charge/discharge cycles, cell capacity rises when returned to the C/10 rate.

SEM images (not shown) of the pre-cycled electrode also agree with our assessment of polymer 5 as an oligomeric three-dimensional material, as high porosity and a thin-coating of SiNPs was observed at high magnification. Following cycling, disassociation of carbon particles from SiNPs is evident, which increased with further cycling. Cracking was observed under all post-cycling circumstances. Intriguing, too, is the gradual 'flattening' of the bulk electrode material, as seen in the differences among the electrodes with no cycling, 35 cycles, and 300+ cycles. These morphological changes, coupled with deposition of material in the side of the separator facing SiNPs, elucidate electrode material separation as a potential mechanism for the initial capacity loss seen in FIG. 10.

As disclosed herein, highly cross-linked polyborosiloxane and ormosil binders employed in a 60 wt. % Si anode allowed for excellent capacity retention. Further analysis of the ormosil binder shows evidence of cross-linking reactions and robust capacity retention in lithium half cells. The cyclability of this electrode is attributed to the functional groups employed, which may be considered not only a logical, but necessary, property for the stable functionality of an electrode with significant volume expansion and contraction. To address initial capacity loss and electrode viability, future studies will involve cycling in full cells as well as further evaluation of the degree of cross-linking and functional group identity on binder physical properties and cycling performance.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Joson, G. and W. Feng (2013). Nanoscale Anodes of Silicon and Germanium for Lithium Batteries. Nanomaterials for Lithium-Ion Batteries, Pan Stanford Publishing: 69-94.

2. Paz-Garcia, J. M., et al. (2016). "4D analysis of the microstructural evolution of Si-based electrodes during lithiation: Time-lapse X-ray imaging and digital volume correlation." Journal of Power Sources 320: 196-203.
3. Candace, K. C., et al. (2013). Silicon Nanowire Electrodes for Lithium-Ion Battery Negative Electrodes. Nanomaterials for Lithium-Ion Batteries, Pan Stanford Publishing: 1-68.
4. Liu, N., et al. (2014). "A pomegranate-inspired nanoscale design for large-volume-change lithium battery anodes." Nat Nanotechnol 9(3): 187-192.
5. Liu, X. H., et al. (2012). "Size-dependent fracture of silicon nanoparticles during lithiation." ACS Nano 6(2): 1522-1531.
6. Luo, L., et al. (2015). "Surface Coating Constraint Induced Self-Discharging of Silicon Nanoparticles as Anodes for Lithium Ion Batteries." Nano Lett 15(10): 7016-7022.
7. Zhu, B., et al. (2015). "Scalable Production of Si Nanoparticles Directly from Low Grade Sources for Lithium-Ion Battery Anode." Nano Lett 15(9): 5750-5754.
8. Fang, C., et al. (2015). "Improving the Electrochemical Performance of Si Nanoparticle Anode Material by Synergistic Strategies of Polydopamine and Graphene Oxide Coatings." The Journal of Physical Chemistry C 119(4): 1720-1728.
9. Delpuech, N., et al. (2014). "Critical Role of Silicon Nanoparticles Surface on Lithium Cell Electrochemical Performance Analyzed by FTIR, Raman, EELS, XPS, NMR, and BDS Spectroscopies." The Journal of Physical Chemistry C 118(31): 17318-17331.
10. Xu, J., et al. (2015). "High Capacity Silicon Electrodes with Nafion as Binders for Lithium-Ion Batteries." Journal of the Electrochemical Society 163(3): A401-A405.
11. Magasinski, A., et al. (2010). "Toward efficient binders for Li-ion battery Si-based anodes: polyacrylic acid." ACS Appl Mater Interfaces 2(11): 3004-3010.
12. Buqa, H., et al. (2006). "Study of styrene butadiene rubber and sodium methyl cellulose as binder for negative electrodes in lithium-ion batteries." Journal of Power Sources 161(1): 617-622.
13. Jeena, M. T., et al. (2014). "Multifunctional molecular design as an efficient polymeric binder for silicon anodes in lithium-ion batteries." ACS Appl Mater Interfaces 6(20): 18001-18007.
14. Koo, B., et al. (2012). "A highly cross-linked polymeric binder for high-performance silicon negative electrodes in lithium ion batteries." Angew Chem Int Ed Engl 51(35): 8762-8767.
15. Liu, B., et al. (2013). "Three-dimensional hierarchical ternary nanostructures for high-performance Li-ion battery anodes." Nano Lett 13(7): 3414-3419.
16. Wang, Q. T., et al. (2014). "Enhanced cycling stability of silicon anode by in situ polymerization of poly(aniline-co-pyrrole)." RSC Advances 4(96): 54134-54139.
17. Wu, H., et al. (2013). "Stable Li-ion battery anodes by in-situ polymerization of conducting hydrogel to conformally coat silicon nanoparticles." Nat Commun 4: 1943.
18. Yu, X., et al. (2015). "Three-Dimensional Conductive Gel Network as an Effective Binder for High-Performance Si Electrodes in Lithium-Ion Batteries." ACS Appl Mater Interfaces 7(29): 15961-15967.
19. Chiu, H. T. and J. H. Wu (2005). "Conductive effect of an electronic/ionic complex conductivity modifier for silicone elastomers." Journal of Applied Polymer Science 97(3): 711-720.
20. Tsuchida, N. and M. Ueda (1980). "Ionic behaviours in silicone oil." Journal of Physics D: Applied Physics 13(9): 1681.
21. Inada, T., et al. (2003). "Silicone as a binder in composite electrolytes." Journal of Power Sources 119-121: 948-950.
22. Kim, G. D., et al. (1999). "Synthesis and applications of TEOS/PDMS hybrid material by the sol-gel process." Applied Organometallic Chemistry 13(5): 361-372.
23. Brinker, C. J. (1988). "Hydrolysis and condensation of silicates: Effects on structure." Journal of Non-Crystalline Solids 100(1-3): 31-50.
24. Shit, S. C. and P. Shah (2013). "A Review on Silicone Rubber." National Academy Science Letters 36(4): 355-365.
25. Kurono, R. e. a. (2001). "Preparation and characterization of lithium ion conducting borosiloxane polymer electrolytes." Electrochimica Acta(47): 483-487.
26. Shim, J., et al. (2015). "Polymer composite electrolytes having core-shell silica fillers with anion-trapping boron moiety in the shell layer for all-solid-state lithium-ion batteries." ACS Appl Mater Interfaces 7(14): 7690-7701.
27. Fujinami, T., et al. (2004). "Proton conducting borosiloxane-poly(ether-sulfone) composite electrolyte." Electrochimica Acta 50(2-3): 627-631.
28. Garcia, N. (2007). "Use of p-Toluenesulfonic Acid for the Controlled Grafting of alkoxysilanes onto silanol containing surfaces." J Am Chem Soc: 5052-5060.
29. Wanglee, Y. J., et al. (2012). "Borane-induced dehydration of silica and the ensuing water-catalyzed grafting of B(C6F5)3 to give a supported, single-site Lewis acid, identical with SiOB(C6F5)2." J Am Chem Soc 134(1): 355-366.
30. Li, X., et al. (2014). "Synthesis of polyborosiloxane and its reversible physical crosslinks." RSC Advances 4(62): 32894.
31. Seetapan, N., et al. (2013). "Unimodal and bimodal networks of physically crosslinked polyborodimethylsiloxane: viscoelastic and equibiaxial extension behaviors." Journal of Polymer Research 20(7).
32. D'Elia, E., et al. (2015). "Self-healing graphene-based composites with sensing capabilities." Adv Mater 27(32): 4788-4794.
33. Jiantao, W. (2016). "A Mini Review: Nanostructured Silicon-based Materials for Lithium Ion Battery." Nanoscience & Nanotechnology—Asia 6(1): 3.
34. Mingyue, W. (2015). "Advances in nanostructure design and composite of silicon-based materials and their application in the lithium-ion battery anode materials." Zhongguo Keji Lunwen 10(6): 728.
35. Lanlan, Z. (2015). "Nanomaterials in Anodes for Lithium Ion Batteries: Science and Manufacturability." Nanoscience & Nanotechnology—Asia 5(2): 68.
36. Li-qiang, Y. (2014). "Research progress in binders of Si-based anodes for Li-ion battery." Dianchi 44(4): 238.
37. Bernard, L. (2010). "Functions of polymers in composite electrodes of lithium ion batteries." Comptes Rendus Chimie 13(11): 1341.
38. "BINDER FOR LITHIUM ION BATTERY POSITIVE ELECTRODE, PASTE FOR LITHIUM ION BATTERY POSITIVE ELECTRODE CONTAINING THE SAME, AND METHOD FOR MANUFACTURELITHIUM ION BATTERY POSITIVE ELECTRODE." Bibliographic data: JP2013069466 (A)—2013 Apr. 18
39. "Electrode for an Li ion battery having a polyether-siloxane copolymer as binder." Bibliographic data: EP2757617 (A1)—2014 Jul. 23

40. "LITHIUM SECONDARY BATTERY, MANUFACTURING METHOD FOR THE SAME, AND BINDER PRECURSOR SOLUTION FOR LITHIUM SECONDARY BATTERY USED FOR ITS MANUFACTURING METHOD." Bibliographic data: JP2010238562 (A)—2010 Oct. 21
41. "SECONDARY BATTERY HAVING IMPROVED CHARGING AND DISCHARGING PROPERTIES." Bibliographic data: KR20130011154 (A)—2013 Jan. 30
42. Jeena, M. T., et al. (2016). "A siloxane-incorporated copolymer as an in situ cross-linkable binder for high performance silicon anodes in Li-ion batteries." Nanoscale 8(17): 9245-9253.
43. Kim, J. S., et al. (2014). "Siloxane-capped amorphous nano-SiOx/graphite with improved dispersion ability and battery anode performance." RSC Advances 4(25): 12878.
44. JP2001068115
45. U.S. Pat. No. 5,824,280

It will be understood that various details of the presently disclosed subject matter can be changed without departing from the scope of the subject matter disclosed herein. Furthermore, the foregoing description is for the purpose of illustration only, and not for the purpose of limitation.

We claim:

1. An anode for a rechargeable battery, comprising:
   (a) silicon; and
   (b) a crosslinked polysiloxane binder, comprising:
      (i) polysiloxane comprising polydimethylsiloxane (PDMS); and
      (ii) crosslinkers selected from the group consisting of triethoxyphenylsilane (TEPS), boric acid, and combinations thereof,
   wherein the crosslinked polysiloxane binder comprises the crosslinkers in an amount from about 50 wt % to less than 100 wt % of the total weight of the crosslinked polysiloxane binder.

2. The anode of claim 1, wherein the binder comprises a mass % of PDMS of about 50% to 92.5%, TEPS of about 0% to 30%, and boric acid of about 5% to 20%.

3. The anode of claim 1, wherein the binder comprises a mass % of PDMS:TEPS:boric acid of 50:30:20.

4. The anode of claim 1, wherein a mass ratio of the crosslinkers, selected from the group consisting of triethoxyphenylsilane (TEPS), boric acid, and combinations thereof, to PDMS is 0.9:1 to about 1.1:1.

5. The anode of claim 1, wherein the binder comprises the crosslinkers in a mass % of TEPS: boric acid of 80:20.

6. The anode of claim 1, wherein the anode is prepared from a slurry comprising the silicon, carbon black, and the crosslinked polysiloxane binder.

7. The anode of claim 6, wherein the silicon of the slurry comprises silicon nanoparticles.

8. The anode of claim 7, wherein the silicon nanoparticles have a 30-50 nm average particle size.

9. The anode of claim 7, wherein the silicon nanoparticle, the carbon black, and the crosslinked polysiloxane binder are provided in a mass ratio of 3:1:1.

10. The anode of claim 6, wherein the slurry further comprises diglyme.

11. The anode of claim 6, wherein the crosslinked polysiloxane binder is provided as a solution in tetrahydrofuran.

12. The anode of claim 11, wherein the crosslinked polysiloxane binder is provided in solution at 10-15 wt %.

13. The anode of claim 6, wherein the anode is a cured anode, which has been cured in ambient air.

14. The anode of claim 1, wherein the anode is prepared from a slurry comprising the silicon provided as silicon nanoparticles, carbon black, and a mixture of the TEPS and the boric acid.

15. The anode of claim 1, wherein the silicon comprises about 60 wt % of the anode.

16. The anode of claim 15, wherein the anode is a cured anode, which has been cured in ambient air at a temperature of about 130° C. to about 150° C.

17. A rechargeable battery comprising the anode of claim 1.

* * * * *